(12) United States Patent
Gabriel et al.

(10) Patent No.: US 7,983,957 B2
(45) Date of Patent: Jul. 19, 2011

(54) METHOD AND SYSTEM FOR ENTERING ITEMS INTO A GIFT REGISTRY

(75) Inventors: Michael R. Gabriel, Foster City, CA (US); George Mount, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 155 days.

(21) Appl. No.: 12/107,473

(22) Filed: Apr. 22, 2008

(65) Prior Publication Data

US 2009/0265387 A1    Oct. 22, 2009

(51) Int. Cl.
*G06Q 30/00* (2006.01)
(52) U.S. Cl. ........... 705/26.1; 705/27.1; 705/26.8
(58) Field of Classification Search ............ 705/26, 705/27

See application file for complete search history.

(56) References Cited

U.S. PATENT DOCUMENTS

| | | | |
|---|---|---|---|
| 7,347,373 B2* | 3/2008 | Singh | 235/462.25 |
| 2002/0002504 A1* | 1/2002 | Engel et al. | 705/26 |
| 2005/0198095 A1* | 9/2005 | Du et al. | 709/200 |
| 2005/0246238 A1* | 11/2005 | Dvorak | 705/26 |
| 2009/0164340 A1* | 6/2009 | Lluch | 705/27 |
| 2009/0216549 A1* | 8/2009 | Causey et al. | 705/1 |

OTHER PUBLICATIONS

Want a (fill in the blank) as a wedding gift? Just register it online;National post. Don Mills. Ont.; Mar. 16, 2000.*

* cited by examiner

*Primary Examiner* — Jeffrey A Smith
*Assistant Examiner* — Courtney Stopp
(74) *Attorney, Agent, or Firm* — Park, Vaughan, Fleming & Dowler LLP; Chia-Hsin Suen

(57) ABSTRACT

Some embodiments of the present invention provide a system that enters items into a gift registry. During operation, the system photographically captures images of items at stores containing the items. Moreover, the images include a set of barcodes identifying the items. Next, the system obtains a set of product codes for the one or more items from the barcodes in the images. Finally, the system enters the one or more items in the gift registry using the product codes.

16 Claims, 4 Drawing Sheets

METHOD AND SYSTEM FOR ENTERING ITEMS INTO A GIFT REGISTRY

RELATED APPLICATION

The subject matter of this application is related to the subject matter in a co-pending non-provisional application by inventors Michael R. Gabriel, George Mount, and Dante Cassanego and filed on the same day as the instant application entitled, "METHOD AND SYSTEM FOR PROVIDING GIFT REGISTRY SERVICES THROUGH A GIFT REGISTRY NETWORK," having Ser. No. 12/107,572, and filed on 22 Apr. 2008.

BACKGROUND

Related Art

The present invention relates to techniques for entering items into a gift registry.

Gifts are often given for occasions such as weddings, baby showers, holidays, birthdays, and/or ceremonies. In addition, gift registries are typically offered by merchants as a convenient way to manage the purchase of gifts for a recipient of the gifts. To use a gift registry, the recipient may add a list of items from the merchant to the gift registry and provide the gift registry to buyers of the gifts, such as friends, family, or associates. The buyers may then select items to purchase by viewing the gift registry. When an item is purchased by a buyer, the item is removed from the gift registry, thus preventing the item from being purchased for the recipient multiple times.

However, standard gift registry services may have a number of drawbacks. First, the availability of items offered for inclusion in a particular gift registry may be limited by the merchant offering the gift registry services. In other words, a gift registry from a particular merchant may only include items offered by the merchant. Furthermore, users may have difficulty finding and adding items to the gift registry. In particular, a user may browse available items and enter the items into his/her gift registry by navigating through a web-based interface provided by the merchant. However, the user may also wish to physically view the items by visiting one or more locations of the merchant or store. As a result, the user may be required to both manually maintain a list of items he/she is interested in while visiting a location of the merchant and subsequently add the list of items to the gift registry by entering details of the items into the web-based interface. Hence, potential gift registry users may be deterred by a limited selection of items offered for inclusion in gift registries and inconveniences associated with adding items to the gift registries.

SUMMARY

Some embodiments of the present invention provide a system that enters items into a gift registry. During operation, the system photographically captures images of items at stores containing the items wherein the images include barcodes identifying the items. Next, the system obtains a set of product codes for the one or more items from the barcodes in the images. Finally, the system enters the one or more items in the gift registry using the product codes.

In some embodiments, the system also obtains store information associated with the stores and updates the items in the gift registry with the store information.

In some embodiments, the items are entered into the gift registry by looking up product information for the items using the product codes and entering the product information into the gift registry.

In some embodiments, the product information can be a product name, a product description, a product image, a product price, a product availability, or a product review.

In some embodiments, the images are captured using a still camera, a digital camera, a mobile phone, a personal digital assistant (PDA), or a barcode reader.

In some embodiments, the barcodes are Universal Product Codes (UPCs).

DETAILED DESCRIPTION

Figure 1:
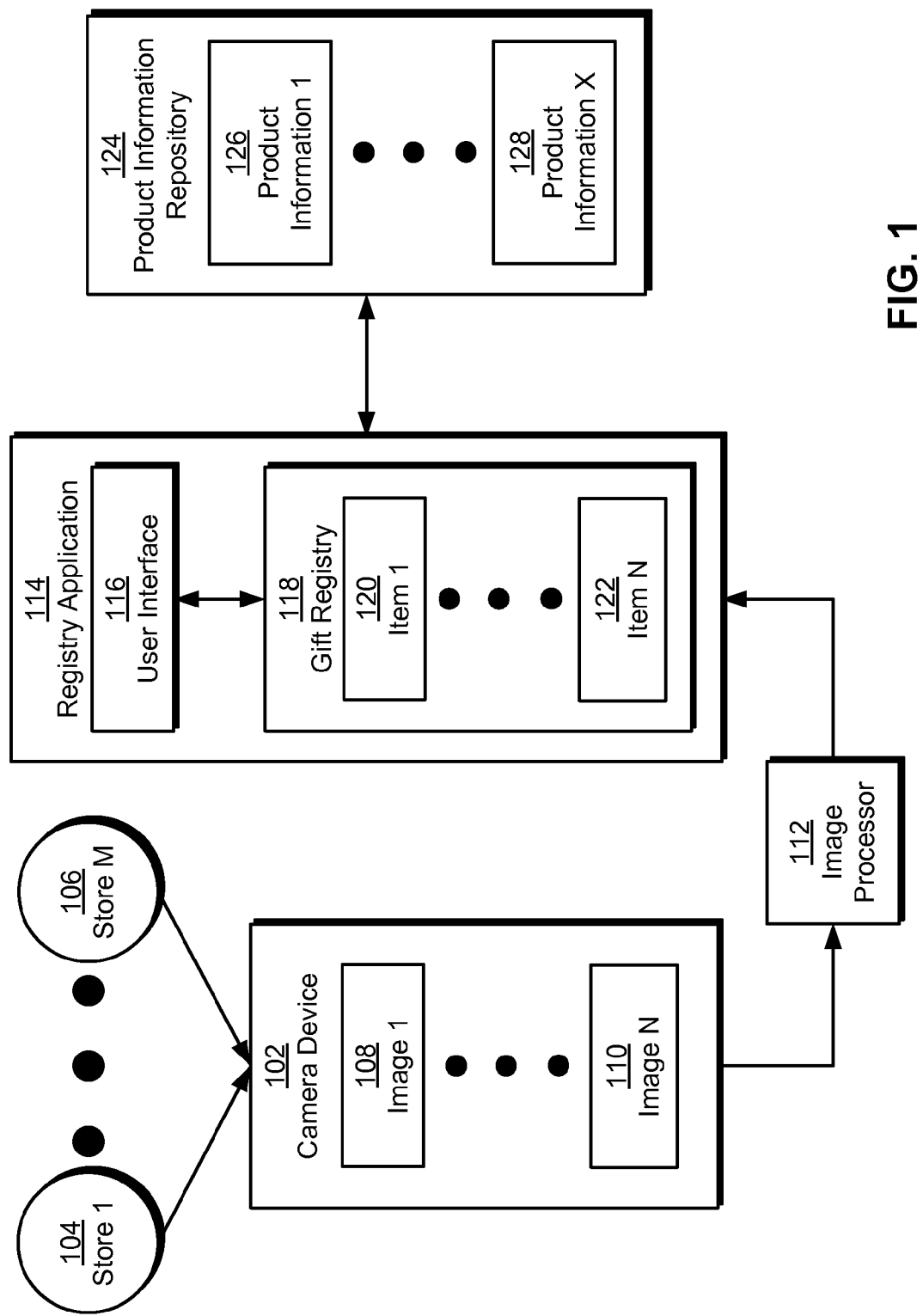
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the invention provide a method and system for entering items into a gift registry. The gift registry may be associated with one or more stores or merchants selling the items. In one or more embodiments of the invention, the user may select items from stores or merchants that list their inventories on a gift registry network. On the other hand, the gift registry may be created from an ad hoc network of stores and/or merchants from which the user has selected items to add to the gift registry. For example, the user may physically browse an arbitrary set of stores for items he/she may be interested in and add items to the gift registry while browsing.

More specifically, embodiments of the invention provide a method and system for entering items into the gift registry by photographically capturing images of the items at stores containing the items. The images may be captured using camera devices such as still cameras, digital cameras, mobile phones, personal digital assistants (PDAs), and/or barcode readers. In addition, the images may contain barcodes identifying the items, which may be analyzed to obtain product codes for the items. The product codes may then be used to enter the items into the gift registry by looking up product information for the items using the product codes and entering the product information into the gift registry. Finally, store information associated with the stores may also be obtained and used to update the items in the gift registry.

FIG. 1 shows a schematic of a system in accordance with an embodiment of the present invention. In particular, FIG. 1 shows a schematic of a system for entering items into a gift registry 118 in accordance with an embodiment of the present invention. As shown in FIG. 1, the system includes a camera device 102, an image processor 112, a registry application 114, and a product information repository 124. Each of these components is described in further detail below.

Registry application 114 may provide gift registry services to a user. More specifically, registry application 114 may allow the user to create gift registry 118 and manage a number of items (e.g., item 1 120, item n 122) using gift registry 118. Gift registry 118 may then be used to facilitate the purchasing of the items for the user by potential buyers of the items, such as friends, family, and/or other acquaintances of the user. For example, gift registry 118 may be created for a special occasion associated with the user, such as a wedding, baby shower, birthday, and/or holiday. Acquaintances of the user wishing to buy gifts for the user may view the items (e.g., item 1 120, item n 122) within gift registry 118 and purchase one or more items as gifts for the user. In addition, items purchased by the acquaintances may be removed from gift registry 118 to prevent the items from being redundantly purchased by multiple buyers.

In one or more embodiments of the invention, registry application 114 is implemented using a client-server architecture. More specifically, registry application 114 may be executed on one or more servers. In addition, registry application 114 may be accessed from other machines using a web browser and network connection. Alternatively, registry application 114 may be locally installed on a computing system, such as a personal computer (PC), mobile phone, personal digital assistant (PDA), and/or other digital computing device of the user.

To interact with the user and/or potential buyers of items within gift registry 118, registry application 114 may include a user interface 116 (e.g., graphical user interface (GUI), web-based user interface, etc.) that is accessed by the user and/or potential buyers. To use registry application 114, the user and/or potential buyers may navigate through one or more screens of user interface 116 and interact with user interface elements such as form fields, calendar widgets, radio buttons, menus, and/or checkboxes. For example, user interface 116 may allow the user to enroll with registry application 114, add and remove items from gift registry 118, add information about items, and/or provide a list of the items to potential buyers of the items. The potential buyers may also interact with user interface 116 to view the list of items in gift registry 118 and remove items that have been purchased.

In one or more embodiments of the invention, user interface 116 enables manual entry of items into gift registry 118. For example, user interface 116 may include form fields that prompt the user for product information related to an item, such as a product name, a product description, a product image, a product price, a product availability, and/or a product review. Alternatively, user interface 116 may ask the user for a link (e.g., hyperlink) to a website that contains the product information. However, the user may find manual search and/or input of items to be difficult and/or inconvenient. In other words, the user may be unable or willing to manage items in gift registry 118 by entering input through user interface 116. The user may additionally have trouble selecting items for gift registry 118 without the ability to physically inspect the items.

To facilitate the user's selection and entry of items into gift registry 118, registry application 114 may include mechanisms that allow the user to both physically interact with the items and minimize manual entry into user interface 116. In particular, registry application 114 may obtain images (e.g., image 1 108, image n 110) from a camera device 102 as input and use the images to enter items into gift registry 118, as explained below.

Camera device 102 may correspond to an electronic and/or mechanical device that allows the user to capture photographic images (e.g., image 1 108, image n 110), such as still images, digital images, and/or video. For example, camera device 102 may still be a still camera, a digital camera, a mobile phone, a personal digital assistant (PDA), and/or a barcode reader. In addition, camera device 102 may use components such as a lens, digital image sensor, and/or film to capture the images. Camera device 102 may further include functionality to store the images. For example, digital images captured by camera device 102 may be stored on memory (e.g., a memory card) within camera device 102. Similarly, analog images captured by camera device 102 may be stored on film loaded into camera device 102.

In one or more embodiments of the invention, camera device 102 may be employed by the user to capture images of items at one or more stores (e.g., store 1 104, store m 106) containing the items. In other words, the user may visit a store, physically interact with items inside the store, and photographically capture images of items he/she is interested in using camera device 102. Furthermore, the images of the items may include barcodes identifying the items. In one or more embodiments of the invention, the barcodes correspond to Universal Product Codes (UPCs).

Once the images are captured by camera device 102, the images may be analyzed by image processor 112 to obtain a set of product codes for the items from the barcodes of the items. In particular, image processor 112 may apply one or more image processing techniques to decipher the product code encoded in a barcode within an image of the barcode. For example, image processor 112 may obtain a set of pixels from the image corresponding to the barcode and scan the pixels for patterns that represent digits of the encoded product code.

The product codes may then be sent to registry application 114 and used to enter the items into gift registry 118. In one or more embodiments of the invention, items are entered into gift registry 118 by looking up product information (e.g., product information 1 126, product information x 128) using the product codes for the items from product information repository 124. Product information for each item may include a product name, a product description, a product image, a product price, a product availability, and/or a product review. The items may then be represented in gift registry 118 using the product information for the items. As a result, the user and/or potential buyers may identify and/or recognize the items in gift registry 118 using the product information for the items rather than barcodes and/or product codes.

For example, the user and/or potential buyers may view a webpage and/or screen of user interface 116 containing product information for one or more items in gift registry 118. Based on the product information, the user may decide to remove the item(s), change the quantities desired for each item, and/or change other preferences associated with the item(s). Similarly, the potential users may use the product information to select items to purchase for the user.

Those skilled in the art will appreciate that image processor 112 may form a part of camera device 102 and/or registry application 114 or exist as a separate entity. For example, camera device 102 may correspond to a portable computing device with network connectivity, such as a mobile phone or PDA. As a result, camera device 102 may include image processor 112 so that product codes obtained from the images may be transmitted directly to registry application 114 from camera device 102.

On the other hand, camera device 102 may correspond to an electronic or mechanical device with a specific photographic functionality, such as a still camera and/or digital camera. To obtain product codes and send the product codes to registry application 114, the user may upload and/or scan the images from camera device 102 into a computing system with network connectivity, such as a personal computer (PC), workstation, and/or laptop computer. Image processor 112 may be installed as a software module within the computing system and allow the computing system to send product codes obtained from the images to registry application 114.

Finally, image processor 112 may form a part of registry application 114 and/or reside on the same server and/or computer cluster as registry application 114. As a result, the user may upload the images directly to registry application 114, which may use image processor 112 to obtain product codes from the images and enter items into gift registry 118 using the product codes. Registry application 114 may also store the images as verification of the items entered into gift registry 118. Items in gift registry 118 may then be used to manage the purchase of gifts for the user, as described above.

Store information for stores (e.g., store 1 104, store m 106) may also be included in gift registry 118. More specifically, registry application 114 may obtain store information associated with stores from which the images of the items were taken using camera device 102. The items in gift registry 118 may then be updated with the store information. In other words, items in gift registry 118 may include both product information about the items and store information about stores containing the items. Potential buyers of the items may use the store information to locate and purchase the items for the user.

In one or more embodiments of the invention, store information for items in gift registry 118 is obtained from the user. For example, the user may enter a store's name, location, hours of operation, and/or other details about the store into registry application 114 using user interface 116. The user may also specify one or more items in gift registry 118 that may be found at the store. Registry application 114 may then update the specified item(s) in gift registry 118 with the store information.

Alternatively, store information may be obtained by registry application 114 using methods that do not require user input of the store information. In particular, registry application 114 may obtain store information from camera device 102 and/or images captured using camera device 102. For example, camera device 102 may include a Global Positioning System (GPS) receiver that tracks the user's location as camera device 102 is used to capture the images. In addition, each image may include a timestamp that allows the image to be matched with the user's location at or around the time the image was taken. The location may then be used by registry application 114 to identify a store at the location and add store information associated with the store to the item corresponding to the image.

Figure 2:
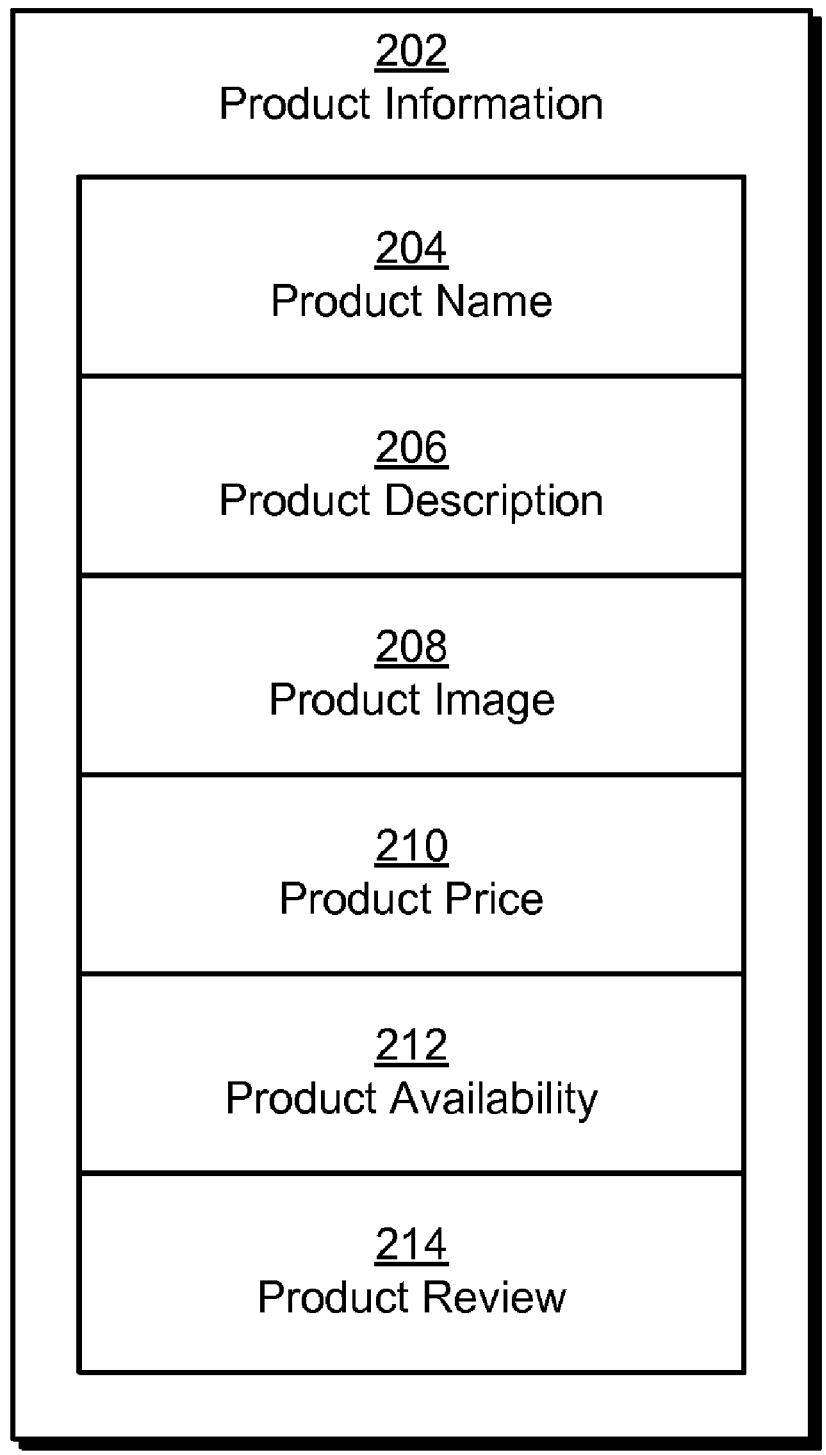
FIG. 2 shows product information for an item in accordance with an embodiment of the present invention.

FIG. 2 shows product information for an item in accordance with an embodiment of the present invention. As mentioned previously, product information 202 may be used to represent an item in a gift registry, such as gift registry 118 of FIG. 1. Product information 202 may be obtained from a product information repository, such as product information repository 124 of FIG. 1. In addition, product information 202 may include a number of fields, including a product name 204, a product description 206, a product image 208, a product price 210, a product availability 212, and a product review 214. Data corresponding to the fields may allow a user to identify the item by examining product information 202 corresponding to the item. For example, product information 202 may be displayed in a webpage associated with the item, allowing the user to view details associated with the item and manage the item within the gift registry.

Product name 204 may refer to a word-based identifier for the item, such as a brand name and/or model. For example, product name 204 for a car may include a make, model, and year of the car. Product name 204 may also contain other details about the product's features. For example, a car's product name 204 may also include the car's color, trim, and/or type of transmission. Additional information about the item may be found in product description 206. In other words, product description 206 may correspond to a brief synopsis of attributes such as the product's features, operation, capabilities, and/or highlights. For example, a car's product description 206 may include a listing of the car's fuel economy, dimensions, performance numbers, parts, and/or other features.

Product image 208 may correspond to a visual representation of the item. In particular, product image 208 may be provided by a manufacturer and/or advertiser of the product to help the user gain a better sense of the item's form, function, and/or features. Product image 208 may further allow the user and/or potential buyers to identify the item in a store.

Product price 210 and product availability 212 may assist potential buyers with the purchase of the item. In addition, product price 210 and product availability 212 may be influenced by the store in which the item is located. As a result, product information 202 may include a range of product prices and product availabilities from stores that offer the item. Alternatively, product price 210 and product availability 212 may be obtained from the store in which the item was found by the user.

Product review 214 may correspond to opinions of the item by other users of the item. Product review 214 may aid the user with including the item in the gift registry or removing the item from the gift registry. Product review 214 may also allow potential buyers to decide on the item to purchase for the user.

Figure 3:
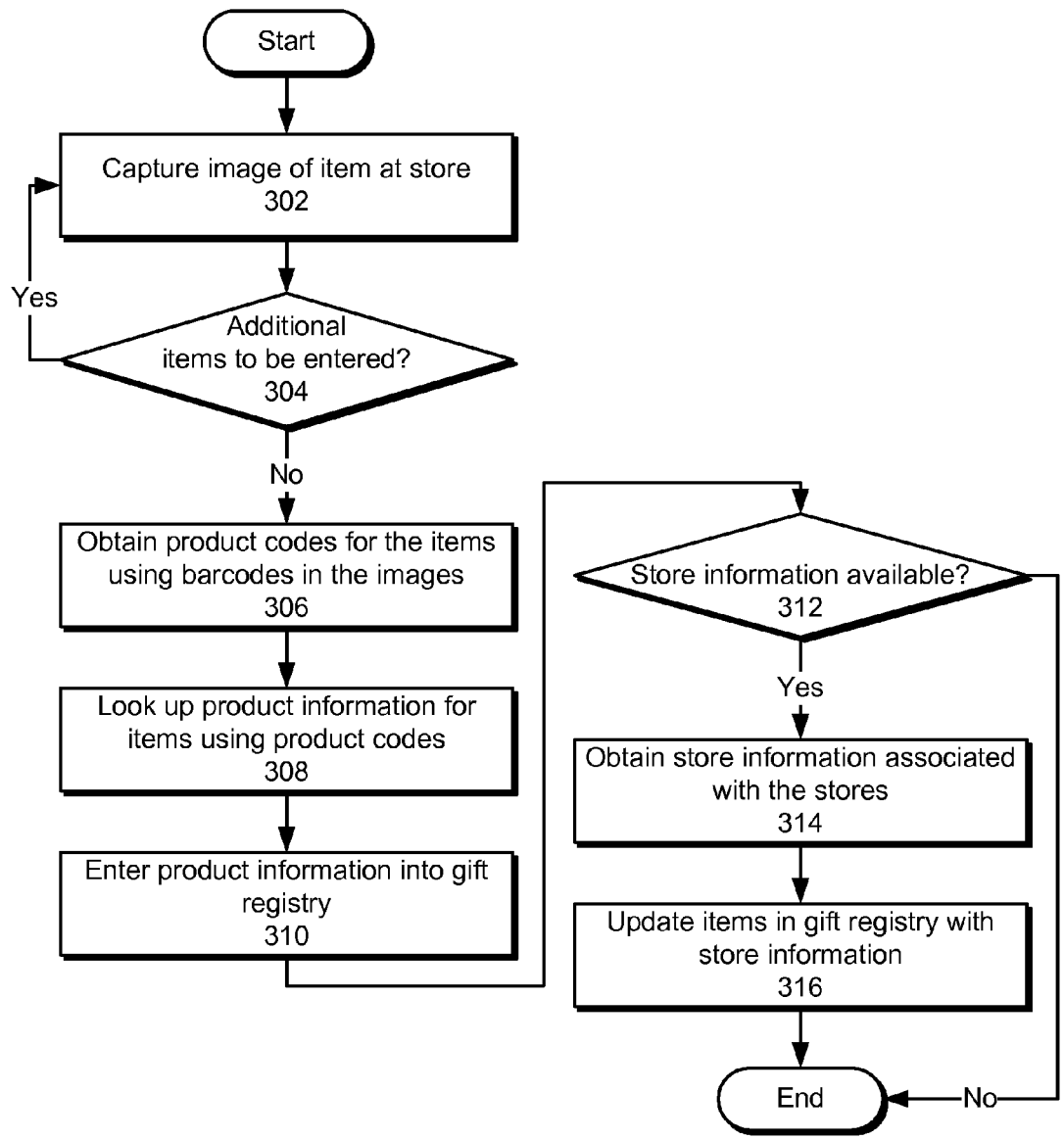
FIG. 3 shows a flowchart illustrating the process of entering items into a gift registry in accordance with an embodiment of the present invention.

FIG. 3 shows a flowchart illustrating the process of entering items into a gift registry in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, an image of an item is captured at a store containing the item (operation 302). The image may be photographically captured using a camera device such as a still camera, a digital camera, a mobile phone, a personal digital assistant (PDA), and/or a barcode reader. The image may also include a barcode identifying the item, such as a UPC. In addition, other items may be entered into the gift registry (operation 304). If other items are to be entered, images of those items are photographically captured at stores containing the items. In other words, the camera device may be operated by a user to capture images of barcodes identifying items he/she would like to add to the gift registry.

Next, product codes for the items are obtained using the barcodes in the images (operation 306). More specifically, image processing techniques may be applied to the images to decipher the product codes encoded within the barcodes. The product codes are then used to look up product information for the items (operation 308). The product information may be retrieved from a product information repository by matching the product codes to product information for the items. In addition, product information for each item may include a product name, a product description, a product image, a product price, a product availability, and/or a product review. The items are then entered into the gift registry by entering the product information into the gift registry (operation 310). As a result, the product information serves as a representation of the items in the gift registry and allows users to identify the items.

Store information associated with the stores may also be available (operation 312). As described above, the store information may be provided by a user or obtained using additional information, such as GPS coordinates from the camera device or another device. If the store information is available, the store information is obtained (operation 314) and used to update one or more items in the gift registry (operation 316). As a result, potential buyers may view product information about items the user is interested in, as well as any available store information about stores containing the items. The potential buyers may then use the product and/or store information to make decisions regarding the items to purchase as gifts for the user.

Figure 4:
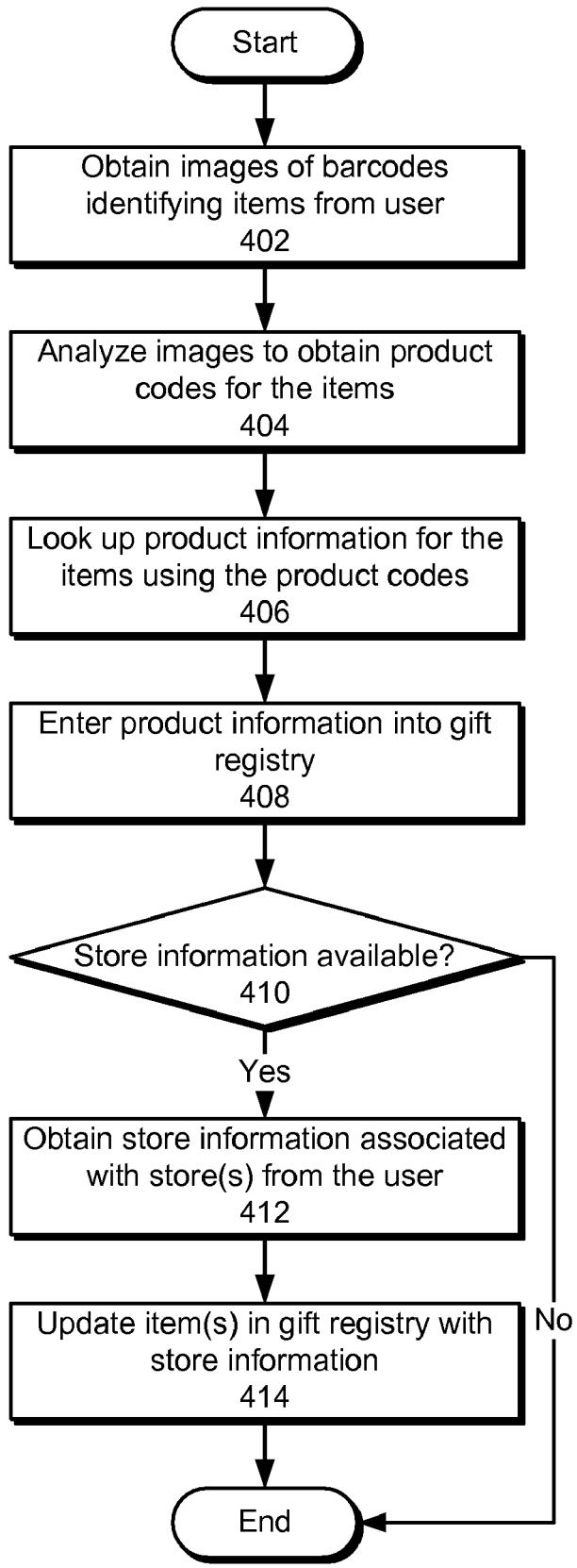
FIG. 4 shows a flowchart illustrating the process of entering items into a gift registry in accordance with an embodiment of the present invention.

FIG. 4 shows a flowchart illustrating the process of entering items into a gift registry in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

Initially, images of barcodes identifying the items are obtained from a user (operation 402). As described above, the images may be photographically captured by the user with a camera device such as a still camera, a digital camera, a mobile phone, a personal digital assistant (PDA), and/or a barcode reader. The images are then analyzed to obtain product codes for the items from the barcodes (operation 404). In particular, the product codes may be encoded using UPC barcodes and obtained by scanning pixels of the images for patterns corresponding to digits of the product codes. Product information for the items is then looked up using the product codes (operation 406) and entered into the gift registry (operation 408). As a result, the product information may serve as a representation of the items in the gift registry.

Store information associated with the stores may also be available (operation 410). If store information is available, the store information is obtained from the user (operation 412) and used to update one or more items in the gift registry (operation 414). The gift registry may then be used to manage the purchase of gifts for the user, as discussed above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for entering items into a gift registry, comprising:
   capturing, by a device, an image of an item at a retail store, wherein the image comprises a barcode identifying the item, and wherein the image is associated with a timestamp;
   obtaining a product code for the item from the barcode in the image;
   tracking the device's location using a GPS receiver to obtain a set of locations with associated timestamps;
   matching the timestamp associated with the image to a timestamp associated with a location in the set of locations;
   identifying a retail store at which the image of the item was captured using the location;
   obtaining product information and retail store information for the item based on the product code for the item and the identified retail store;
   entering the item and the corresponding product and retail store information into the gift registry; and
   displaying the gift registry.

2. The method of claim 1, wherein the product information includes at least one of a product name, a product description, a product image, a product price, a product availability, and a product review.

3. The method of claim 1, wherein the images are captured using at least one of a still camera, a digital camera, a mobile phone, a personal digital assistant (PDA), and a barcode reader.

4. The method of claim 1, wherein the barcodes comprise Universal Product Codes (UPCs).

5. A computer-implemented method for entering items into a gift registry for a user, comprising:
   obtaining an image of a barcode identifying an item from the user, wherein the image is captured using a device at a retail store containing the item, and wherein the image is associated with a timestamp;
   analyzing, by a computer, the image to obtain a product code for the item from the barcode;
   tracking the device's location using a GPS receiver to obtain a set of locations with associated timestamps;
   matching the timestamp associated with the image to a timestamp associated with a location in the set of locations;
   identifying a retail store at which the image of the item was captured using the location;

obtaining product information and retail store information for the item based on the product code for the item and the identified retail store;

entering the item and the corresponding and retail store information into the gift registry; and displaying the gift registry.

6. The method of claim 5, wherein the product information includes at least one of a product name, a product description, a product image, a product price, a product availability, and a product review.

7. The method of claim 5, wherein the images are captured using at least one of a still camera, a digital camera, a mobile phone, a personal digital assistant (PDA), and a barcode reader.

8. The method of claim 5, wherein the barcodes comprise Universal Product Codes (UPCs).

9. A system for entering items into a gift registry, comprising:

a camera device configured to capture an image of an item at a retail store, wherein the image comprises a barcode identifying the item, and wherein the image is associated with a timestamp;

an image processor configured to analyze the image to obtain a product code for the item from the barcode; and a registry application configured to:
track the camera device's location using a GPS receiver to obtain a set of locations with associated timestamps;

match the timestamp associated with the image to a timestamp associated with a location in the set of locations;

identify a retail store at which the image of the item was captured using the location;

obtain product information and retail store information for the item based on the product code for the item and the identified retail store;

enter the item and the corresponding product and retail store information into the gift registry; and display the gift registry.

10. The system of claim 9, wherein the product information includes at least one of a product name, a product description, a product image, a product price, a product availability, and a product review.

11. The system of claim 9, wherein the camera device is at least one of a still camera, a digital camera, a mobile phone, a personal digital assistant (PDA), and a barcode reader.

12. The system of claim 9, wherein the barcodes comprise Universal Product Codes (UPCs).

13. A non-transitory computer-readable storage medium storing instructions that when executed by a computer cause the computer to perform a method for entering items into a gift registry, the method comprising:

capturing an image, by a device, of an item at a retail store containing the item, wherein the image comprises a barcode identifying the item, and wherein the image is associated with a timestamp;

obtaining a product code for the item from the barcode in the image;

tracking the device's location using a GPS receiver to obtain a set of locations with associated timestamps;

matching the timestamp associated with the image to a timestamp associated with a location in the set of locations;

identifying a retail store at which the image of the item was captured using the location;

obtaining product information and retail store information for the item based on the product code for the item and the identified retail store;

entering the item and the corresponding product and retail store information into the gift registry; and displaying the gift registry.

14. The computer-readable storage medium of claim 13, wherein the product information includes at least one of a product name, a product description, a product image, a product price, a product availability, and a product review.

15. The computer-readable storage medium of claim 13, wherein the images are captured using at least one of a still camera, a digital camera, a mobile phone, a personal digital assistant (PDA), and a barcode reader.

16. The computer-readable storage medium of claim 13, wherein the barcodes comprise Universal Product Codes (UPCs).

* * * * *